P. P. GLASS.
WRENCH.
APPLICATION FILED OCT. 4, 1911.
1,039,515.
Patented Sept. 24, 1912.
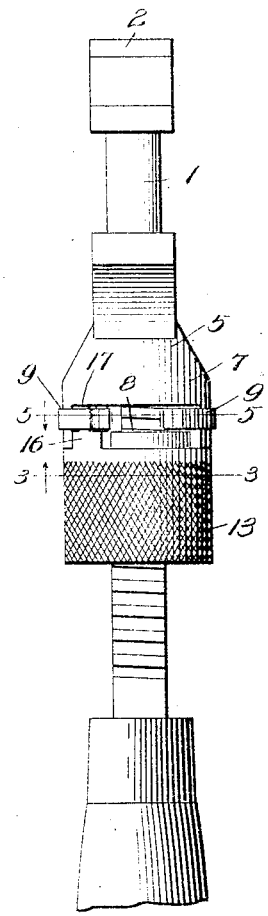
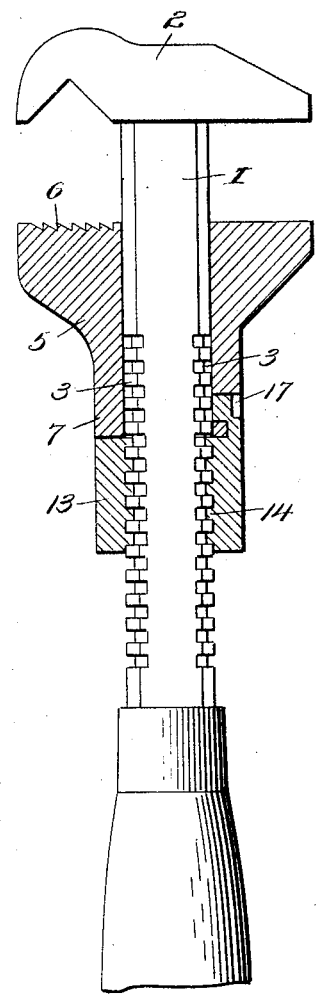
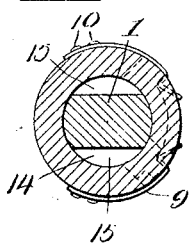
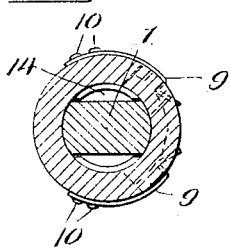
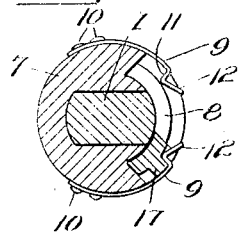
Inventor
Pearl P. Glass.
By Victor J. Evans
Attorney
Witnesses
F. C. Gibson.

UNITED STATES PATENT OFFICE.

PEARL P. GLASS, OF ANADARKO, OKLAHOMA.

WRENCH.

1,039,515.  Specification of Letters Patent.  Patented Sept. 24, 1912.

Application filed October 4, 1911. Serial No. 652,710.

*To all whom it may concern:*

Be it known that I, PEARL P. GLASS, a citizen of the United States, residing at Anadarko, in the county of Caddo and State of Oklahoma, have invented new and useful Improvements in Wrenches, of which the following is a specification.

This invention relates to improvements in quick acting wrenches.

In carrying out my invention it is my purpose to provide a simple and inexpensive quick acting wrench which will draw on a nut after it has been brought up to position.

Another object of my invention is to provide, in a wrench, a threaded stem or shank having an integrally formed head and a movable jaw mounted upon the shank as well as a threaded follower or collar which is also arranged upon the shank and which, upon partial rotation, will force the said movable jaw toward or away from the head of the shank when the jaw and head are to embrace a nut or to be removed therefrom.

A still further object of the invention is to provide the follower with means whereby the same is connected with the slidable jaw, the said means also serving as a stop for limiting the rotary movement of the follower to permit the follower to be locked or unlocked from the teeth of the shank.

With the above recited objects, and others of a similar nature in view, the invention resides in the novel construction, combination and arrangement of parts set forth in and falling within the scope of the appended claim.

In the drawings,—Figure 1 is a perspective view of the wrench with the handle and portion of the shank broken away. Fig. 2 is a side elevation partially in section. Fig. 3 is a sectional view upon the line 3—3 of Fig. 1, illustrating the threaded collar or follower in one position upon the sliding jaw. Fig. 4 is a similar sectional view illustrating the follower in its second position. Fig. 5 is a sectional view upon the line 5—5 of Fig. 1. Fig. 6 is a perspective view of the follower member for the movable jaw.

Referring now to the drawings, the numeral 1 designates a shank or stem provided with a forged head 2. The head projects both to the front and rear of the shank. one projecting portion being substantially V-shaped so as to provide an irregular surface for the reception of pipes, while the other portion of the head has its inner face straight, this portion being adapted to engage with nuts or other straightened surfaces. In each of the opposite faces or edges of the shank 1, I cut threads 3, the same being of any desired pitch, and the extremity of the same is reduced to receive a suitable handle.

Loosely mounted upon the shank 1 is a movable jaw 5, the same having its engaging faces extended both to the front and rear of the said shank, one extending portion being serrated as at 6 and adapted to coact with the V-shaped face of the head 2. The other extending portion is substantially straight and is adapted to coact with the straightened face of the head. The jaw 5 may have integrally formed therewith, or secured thereon in any desired manner, a rigidly extended rounded portion or sleeve 7, and this sleeve is formed adjacent its outer face with a segmental groove or recess 8. This recess is adapted to form a way or channel for a finger which is provided upon a follower or collar, which will be presently described in detail, and the opposite walls of the said recess are adapted to serve as stops for the said pintle to limit the rotatable movement of the follower in either direction upon the shank 1. The sleeve 7 is provided adjacent one or both of the walls forming the stops with a spring catch 9, the same preferably formed of a single strip of resilient material and secured to the sleeve 7, through the medium of rivets 10. The catch 9 has that portion overlying the recess 8 of a substantially V-shaped formation, to provide the off-set wall 11, forming the stop proper, and the arcuate or curved lip or finger hold 12.

The numeral 13 designates the follower for the movable jaw, the said follower being preferably rounded in cross section and having a threaded bore 14 which is, at times, adapted to engage with the threads 3 of the shank so as to force the movable jaw toward the stationary head 2. The bore 14 is, however, provided with longitudinally extending oppositely arranged channels 15, the same being of a width equaling the width of the threads 3, so that when the follower is rotated in one direction, the channels 15 will overlie the threads 3 and permit of the jaw 5, together with the follower 13 being moved manually toward or away from the head of the shank. The follower 13 is integrally formed with an off-set or finger 16, the latter being bent into engagement with the segmental recess 8, and the said finger is also preferably provided with a stud 17. This stud is adapted to be engaged by the catch member 9, when the said follower is rotated in one direction, as illustrated in the figures of the drawings, it being understood, however, and as above referred to, that a pair of the catch members 9 may be employed if desired. By reference to the sectional views it will be noted that the catch member 9 engages with the stud 17 of the finger 16 when the longitudinally extending recesses 15 are brought out of the path of the threads 3 of the shank, so that the follower 13 will move the jaw 5 toward the head 2. When the follower is rotated in an opposite direction, the recesses will overlie the threads of the shank and to permit of the movable jaw as well as the follower being slid in either direction upon the shank.

I am aware that wrenches are in use where a nut or follower has recesses adapted to overlie the screws of the shank, and I do not claim such a structure broadly, but What I do claim is:

In a wrench, the combination with a threaded shank, a movable jaw loosely mounted upon the shank, said jaw having a rearwardly extending sleeve, said sleeve being provided with a segmental recess, a follower, said follower having a finger engaging within the recess, said finger being provided with a stud, and a spring catch member constructed of a single piece of material adapted to engage the stud of the follower when the said follower is rotated upon the shank, and the bore of the follower being provided with longitudinally extending recesses of a width equaling the thickness of the shank, the said recesses being arranged at diametrically opposite points, all substantially as and for the purpose set forth.

In testimony whereof I affix my signature in presence of two witnesses.

PEARL P. GLASS.

Witnesses:
BOOKER H. GLASS,
ERNEST A. WELCH.